United States Patent [19]

Hayashida

[11] 4,400,063
[45] Aug. 23, 1983

[54] F($\theta$) LENS SYSTEM OF FOUR-GROUP CONSTRUCTION

[75] Inventor: Bun Hayashida, Yokosuka, Japan

[73] Assignee: Nippon Kogaku K.K., Tokyo, Japan

[21] Appl. No.: 271,284

[22] Filed: Jun. 8, 1981

[30] Foreign Application Priority Data

Jun. 20, 1980 [JP] Japan .................................. 55/82791

[51] Int. Cl.$^3$ ........................ G02B 3/00; G02B 27/17
[52] U.S. Cl. .................................... 350/415; 350/6.8; 350/6.91
[58] Field of Search ................ 350/415, 6.8, 6.91

[56] References Cited

U.S. PATENT DOCUMENTS 3,687,025 8/1972 Rosin .............................. 350/6.91 X
3,973,833 8/1976 Lawson ............................ 350/6.8 X

FOREIGN PATENT DOCUMENTS 54-126051 9/1979 Japan ..................................... 350/6.8

Primary Examiner—John K. Corbin
Assistant Examiner—Scott J. Sugarman
Attorney, Agent, or Firm—Shapiro and Shapiro

[57] ABSTRACT

This specification discloses an f$\theta$ lens system having an entrance pupil at a remote position on the incident light side of the lens system and having such a negative distortion that the image height H of a parallel light beam incident at an angle $\theta$ with respect to the optical axis with the entrance pupil as the center is $H=f\theta$, where f is the focal length of the entire system. The lens system includes, in succession from the entrance pupil side, a first group having at least one negative lens and having a composite negative refractive power, a second and a third group each having a meniscus lens component having its concave surface facing the entrance pupil side, and a fourth group having at least one positive lens and having a composite positive refractive power.

4 Claims, 5 Drawing Figures

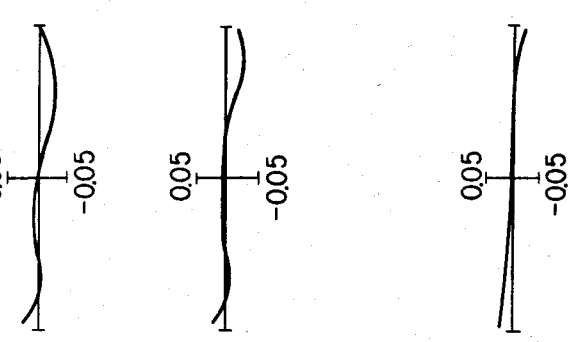
FIG. 3A  LINEARITY OF $y = f\theta$
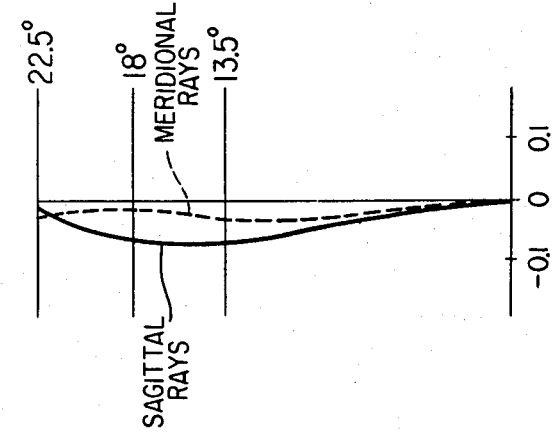
FIG. 3B  ASTIGMATISM
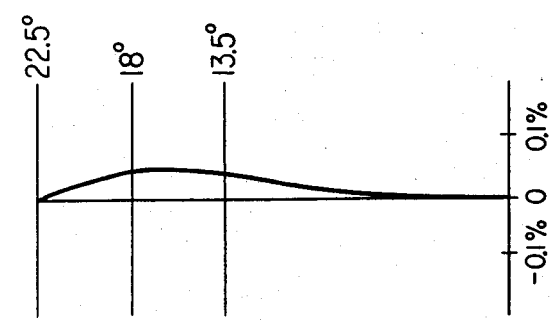
FIG. 3C  LATERAL ABERRATION

F(θ) LENS SYSTEM OF FOUR-GROUP CONSTRUCTION

BACKGROUND OF THE INVENTION

1. Field of the Invention

This invention relates to an fθ lens for use in the scanning optical system of a facsimile, a printer or the like.

2. Description of the Prior Art

In the scanning optical system of a facsimile or the like, for example, a laser beam modulated in accordance with image signals is deflected in a predetermined plane by using, for example, a polygonal reflecting member, and the reflected light beam from this reflecting member is imaged in a predetermined image plane by an imaging lens. Control of the deflection velocity of the light beam by this polygonal mirror, if effected with the angular velocity being constant, is simpler in mechanism and much lower in cost. Thus, the imaging lens is required to have a performance which provides an image height H in the imaging plane directly proportional to the deflection angle θ of the light beam.

Generally, in a convergent type lens system, the angle of incidence θ on the lens system and the image height H in the image plane of the lens system are related such that $H = f \tan \theta$. Where θ is in a small range, θ can be regarded as $\tan \theta \approx \theta$, but in the angle of view required of the scanning optical system, the range of $\tan \theta > 0$ predominater and in order that $H = f\theta$ may be exactly provided, the imaging lens must be endowed with negative distortion.

There are two types of fθ lens system, namely, the telecentric type in which the an entrance pupil and the forward focus of the fθ lens system are made coincident with each other, whereby the principal ray of the light beam after having passed through the fθ lens system becomes parallel to the optical axis of the fθ lens system, and the type in which the entrance pupil is set inwardly of the forward focus of the fθ lens system so that the principal ray of the light beam after having passed through the fθ lens system spreads with respect to the optical axis of the fθ lens system.

The fθ lens system of the telecentric type is excellent in performance for linearity of scanning because the principal ray of the imaging light beam becomes perpendicular to the image plane and thus there is no deviation of the imaging height even for any deviation of the image plane, while on the other hand it has the disadvantages that if the scanning width becomes great, the fθ lens becomes bulky in proportion thereto and that the full length from the entrance pupil to the image plane becomes great. The fθ lens system of the latter type has a disadvantage in that the linearity of scanning becomes poor for any deviation of the image plane because the imaging light beam is inclined with respect to the image plane, while on the other hand it has the advantages that even if the scanning width is made great, the fθ lens does not becomes so bulky and the full length from the entrance pupil to the image plane can be made relatively short. The present invention is concerned with this latter type of fθ lens system.

The performance of an fθ lens can be considered in terms of the angle of view as relating to the scanning width, the imaged spot size as relating to the imaging performance, and the linearity of scanning. With regard to the fθ lens system used in a scanning optical system, it is possible to reduce its cost and enhance its productivity by allowing the occurrence of spherical aberration and coma up to the amount of diffraction determined by F-number in view of the fact that the incident beam diameter is small as compared with the total focal length of the fθ lens system, that is, the effective F-number is great, by allowing the linearity of scanning to vary up to several percent and by using, for example, an fθ lens system of two-lens construction. However, if the incident beam diameter becomes greater and the effective F-number of the fθ lens system becomes smaller, it is difficult to correct the various aberrations of the fθ lens system by a two-lens construction and, thus, a lens system of three-lens or more-lens construction is usually used. Even in such case, if the linearity of scanning is sacrificed and allowed to vary up to about 1%, a two-lens construction will be permissible up to the order of an F-number of 70. On the other hand, if the F-number is greater than 70 and the variation in linearity of scanning becomes as severe as about 0.5%, a two-lens construction will be impossible and a lens system of at least a three-lens construction will be required. Depending on the scanning optical system, there are many fθ lens systems in which the scanning width is long and the angle of view is as wide as about 45° and linearity of scanning of as high accuracy as 0.05%–0.01% is required.

SUMMARY OF THE INVENTION

It is an object of the present invention to provide an improvement over an fθ lens system wherein high accuracy is required for of linearity of scanning.

The invention will become fully apparent from the following detailed description thereof taken in conjunction with the accompanying drawings.

BRIEF DESCRIPTION OF THE DRAWINGS

FIGS. 3A to 3C illustrates the various aberrations in the embodiment of the present invention.

DESCRIPTION OF THE PREFERRED EMBODIMENT

Figure 1:
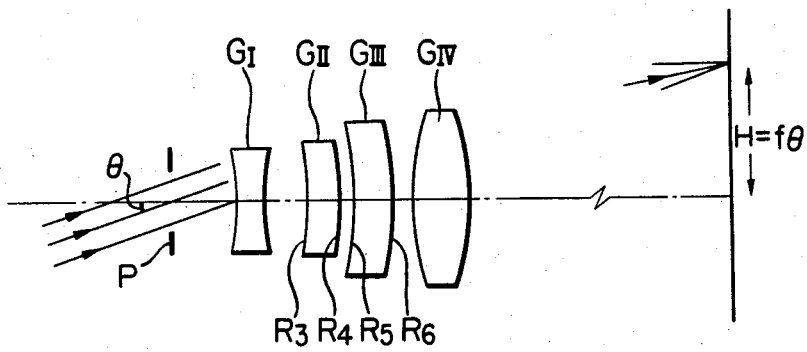
FIG. 1 shows the basic lens construction of the fθ lens system according to the present invention.

The invention will hereinafter be described with reference to the drawings. FIG. 1 shows the basic construction of the lens of the fθ lens system according to the present invention.

As shown in FIG. 1, the fθ lens system according to the present invention has an entrance pupil P at a remote position on the incident light side and has, in succession from the incident light side, a first group $G_I$, a second group $G_{II}$, a third group $G_{III}$ and a fourth group $G_{IV}$. The first group $G_I$ has a negative refractive power, each of the second group $G_{II}$ and the third group $G_{III}$ comprises a meniscus component having its concave surface facing the entrance pupil P and having both of its surfaces with substantially equal radii of curvature, and the fourth group $G_{IV}$ has a positive refractive power. This fθ lens system satisfies the following conditions:

$$0.08f < R_{III} < 0.35f \qquad (1)$$

$$|R_{III}| < |R_{II}| \qquad (2)$$

$$\left.\begin{array}{l}f < |f_{II}| \\ f < |f_{III}|\end{array}\right\} \quad (3)$$

where f is the total focal length of the entire system, $R_3$ and $R_4$ represent the radii of curvature of the successive lens surfaces of the second group $G_{II}$ from the entrance pupil side, $R_5$ and $R_6$ represent the radii of curvature of the successive lens surfaces of the third group $G_{III}$, $R_{II}=(R_3+R_2)/2$, $R_{III}=(R_5+R_6)/2$, and $f_{II}$ and $f_{III}$ are the focal lengths of the second and the third group, respectively.

As is well-known, in an ordinary imaging lens system, there is a relation that $H=f\tan\theta$ between the incidence angle $\theta$ of the light flux with respect to the lens system and the image height H on the imaging plane. On the other hand, a relation that $H=f\theta$ is desired in a lens system required in a scanning optical system. Accordingly, the lens system required in the scanning optical system must purposely be endowed with the following distortion:

$$V = \frac{f\theta - f\tan\theta}{f\tan\theta} \times 100(\%)$$

In the area of a wide angle of view which cannot be regarded as $\tan\theta \approx \theta$, $f\theta < \tan\theta$ and therefore, it is necessary to endow the $f\theta$ lens system with negative distortion. In order that the lens construction as shown in FIG. 1, which has a negative lens in the forward group and a positive lens in the rearward group, may be endowed with negative distortion, the power of the positive lens must be made strong. On the other hand, if the power of the convex lens of the rearward group is made strong, the Petzval sum of the entire lens system becomes too positive and the flatness of the image plane is lost. This makes it difficult to obtain an $f\theta$ lens having a wide angle of view. Further, if the power of the convex lens of this rearward group is made strong, spherical aberration and coma are under-corrected even in an $f\theta$ lens system having an effective F-number of 50 or so and the degree of condensation of the light flux on the image plane is deteriorated and the spot size becomes large as compared with the diffraction limit determined by the effective F-number. As a method of moving the Petzval sum in the negative direction and further introducing distortion in the negative direction, the positive lens of the fourth group may be comprised of a plurality of components and the refractive index of each of the components may be increased, but generally glass of high refractive index is higher in cost and poorer in transmission factor than glass of low refractive index. Furthermore, the lens diameter of the fourth group sometimes becomes as large as about 150 mm$\phi$, and increasing the number of lenses forming the fourth group will be disadvantageous both in weight and cost. Further, the refractive index of ordinary optical glass is up to the order of 1.8 at best and, therefore, the possibility of correcting distortion and other various aberrations by increasing the refractive index is limited. Thus, if there is available a lens member which moves the distortion in the negative direction and also the Petzval sum in the negative direction, or hardly affects the Petzval sum, correction of the various aberrations of the $f\theta$ lens can be achieved considerably easier. What performs such a function is the meniscus lens of the third group having its concave surface facing the pupil side and having both of its surfaces with substantially equal radii of curvature.

A meniscus-like single lens having both of its surfaces with substantially equal radii of curvature has a very weak power as a lens. The function of this meniscus lens will be comprehensible if a parallel planer glass approximately acting as a powerless lens is considered. As is well known, various aberrations such as spherical aberration, astigmatism, distortion, curvature of image field, etc. occur even in an entirely powerless parallel planer glass. Paying attention now to spherical aberration and distortion, it is well known that the spherical aberration $\Delta$ created by the parallel planer glass is given by $$\Delta = \frac{(n'^2 - n^2)nd}{2n'^3} \cdot a^2,$$

where n represents the refractive index of the medium on the opposite sides of the glass, n' represents the refractive index of the glass, d represents the thickness of the glass, and $a$ represents the angle formed by the light flux incident on the glass with respect to the optical axis. Generally, $n' > n$ and therefore, it is seen that this spherical aberration $\Delta$ assumes a positive value proportional to the square of the angle $a$ formed by the on-axis light ray with respect to the optical axis. This shows that as regards the spherical aberration, a concave lens-like action is strong. On the other hand, it is well known that the distortion $\delta$ created by the parallel planer glass is given by $$\delta = \frac{n'^2 - 1}{2n'} \cdot \phi^3 d,$$

where $\phi$ represents the angle formed by the principal ray of the light flux with respect to the optical axis. Since n' is a value greater than 1, it is seen that this amount assumes a negative value proportional to the cube of the angle $\phi$. This shows that as regards the distortion, a convex lens-like action is strong. Further, it is well known that the parallel planer glass which has no power does not affect the Petzval sum, but strictly speaking, it provides a curvature of image field. It is seen that this is good to correct the tendency of the negative curvature of image field becoming stronger if the power of a convex lens is made stronger.

From what has been described above, it is seen that in the $f\theta$ lens system, the meniscus-like lens having both of its surfaces with substantially equal radii of curvature alleviates the spherical aberration, the Petzval sum and even the curvature of image field created when the power of the convex lens is made strong to provide negative distortion, and thus facilitates the correction of various aberrations. The conditions then given are condition (1) and condition (3). As previously described, the spherical aberration created in the parallel planer plate is proportional to $a^2$ and the distortion is proportional to $\phi^3$. Generally, in an $f\theta$ lens system, $a$ is within several degrees at best, while $\phi$ corresponding to the angle of view is severals tens of degrees. Therefore, if the parallel planer plate remains unchanged, the correction for distortion will be excessive and various aberrations cannot be well corrected. This is why, in condition (1), the absolute value of $\gamma_{III}$ is less than 0.35f.

That is, by using a meniscus lens having its concave surface facing the pupil side, the angle of incidence of the principal ray around the angle of view onto the normal of the meniscus lens and the angle of incidence of the on-axis ray onto the optical axis of the meniscus lens are made substantially equal to each other, whereby the balance between the spherical aberration and the distortion created in this meniscus lens is maintained to enable correction of various aberrations as a whole. Also, if the absolute value of $\gamma_{III}$ is less than 0.08f, correction of the coma flare created there will become difficult and the radius of curvature of the meniscus lens will become too small and will offer a problem in manufacture.

Also, if, in condition (3), the absolute value of $f_{III}$ is not greater than f, the power of this meniscus lens will become too strong and the influence imparted to the Petzval sum will become great, so that correction of the curvature of image field will become difficult.

In an fθ lens system wherein the linearity of scanning is required to be of the order of 0.5% to 0.1%, a predetermined performance can be sufficiently obtained simply by adding a group of the aforementioned meniscus lenses. However, in an fθ lens system wherein severe accuracy of 0.05 to 0.01% is required of the linearity of scanning, high orders of distortion cannot be well corrected simply by adding a group of meniscus lenses and therefore, the bending of the distortion at an intermediate angle of view cannot sufficiently be corrected. Therefore, a meniscus lens having its concave surface facing the pupil side and having its both surfaces with substantially equal radii of curvature is inserted as the second group between the first group and the third group. This meniscus lens of the second group is essentially identical in function to the aforementioned meniscus lens of the third group, and the primary purpose thereof is to eliminate high orders of distortion. For that purpose, condition (2) is necessary and, if the absolute value of $\gamma_{II}$ is smaller than the absolute value of $\gamma_{III}$, it will not only become useless for the correction of high orders of distortion but also the correction of the coma created for marginal rays by this meniscus lens will become difficult. The reason why the absolute value of $f_{II}$ in condition (3) must be greater than f is the same as the reason described with respect to the combined focal length $f_{III}$ of the third group, that is, if the power of the meniscus lens of the second group is too strong, the influence imparted to the Petzval sum becomes great and correction of the curvature of image field becomes difficult.

As has hitherto been described, each of the second group and the third group is constructed as a meniscus lens with the fore and rear surfaces thereof having substantially equal radii of curvature, and more specifically, they may be desirably constructed in the ranges of $0.8 < R_4/R_3 < 1.2$ and $0.7 < R_6/R_5 < 1.5$.

Figure 2:
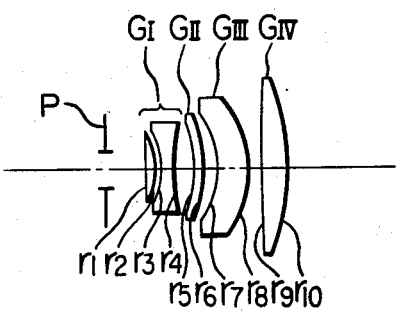
FIG. 2 shows the lens construction which is an embodiment of the present invention.

An embodiment of the present invention will hereinafter be described. In the embodiment of the present invention whose construction is shown in FIG. 2, the negative lens group which is the first group $G_I$ comprises, in succession from the pupil P side, a positive lens and a negative lens, each of the second group $G_{II}$ and the third group $G_{III}$ comprises a single meniscus lens having its concave surface facing the pupil P side, and the fourth group $G_{IV}$ comprises a single positive lens.

The present embodiment is an fθ lens for light of wavelength 6328 Å, and the incident beam diameter thereof is 6 mmφ. Numerical data of the embodiment will be shown in the table below, where $\gamma_1, \gamma_2, \ldots, \gamma_{10}$ represent the radii of curvature of the successive lens surfaces from the incident light side, $d_1, d_2, \ldots, d_9$ represent the center thicknesses and air spaces of the successive lenses, $n_1, n_2, \ldots, n_5$ represent the refractive indices of the successive lenses for light of wavelength 6328 Å, and $f_I, \ldots, f_{IV}$ represent the focal lengths of the respective groups I–IV.

f = 100 mm, 2ω = 45°

The entrance pupil lies 7.095 mm ahead of the first lens surface $\gamma_1$.

| | | | | | |
|---|---|---|---|---|---|
| $\gamma_1 =$ | −152.993 | $d_1 =$ | 1.5 | $n_1 =$ | 1.51508 |
| $\gamma_2 =$ | −13.156 | $d_2 =$ | 0.4 | | |
| $\gamma_3 =$ | −12.495 | $d_3 =$ | 2.4 | $n_2 =$ | 1.51508 |
| $\gamma_4 =$ | 120.666 | $d_4 =$ | 2.4 | | |
| $\gamma_5 =$ | −33.261 | $d_5 =$ | 1.8 | $n_3 =$ | 1.51508 |
| $\gamma_6 =$ | −33.113 | $d_6 =$ | 2.4 | | |
| $\gamma_7 =$ | −15.508 | $d_7 =$ | 5.5 | $n_4 =$ | 1.51508 |
| $\gamma_8 =$ | −18.472 | $d_8 =$ | 2.0 | | |
| $\gamma_9 =$ | 238.413 | $d_9 =$ | 4.5 | $n_5 =$ | 1.51508 |
| $\gamma_{10} =$ | −37.308 | | | | |
| $f_I =$ | −109.8 | $f_{II} =$ | 2814 | | |
| $f_{III} =$ | −508.0 | $f_{IV} =$ | 64.0 | | |

Groups: $G_1$ ($\gamma_1$–$\gamma_4$), $G_2$ ($\gamma_5$–$\gamma_6$), $G_3$ ($\gamma_7$–$\gamma_8$), $G_4$ ($\gamma_9$–$\gamma_{10}$).

FIGS. 3A to 3C illustrate the various aberrations in the present embodiment.

FIG. 3A illustrates the linearity of scanning and shows that in the best image plane, the linearity of scanning is good, being within ±0.025%. FIG. 3B illustrates astigmatism. The dotted line indicates the aberration in the meridional direction, and the solid line indicates the aberration in the saggital direction. As seen, astigmatism is −0.07 mm at greatest, which is sufficiently small as compared with the depth by the brightness of the lens system. Therefore, for the total angle of view, the spot size of the image plane is 10 μmφ or less, which is smaller than the spot size of the diffraction determined by the F-number of the lens system. The constructions of the first group and the fourth group are not limited to the constructions shown in the above-described embodiment, but they may be comprised of a number lenses selected in accordance with the F-number and angle of view. Also, if the refractive index of each lens group is made higher, there may, of course, be realized an fθ lens system of higher performance for the same construction.

Thus, according to the present invention, there is provided an fθ lens system which is simple and compact in lens construction and good in linearity of scanning being sufficiently bright.

I claim:

1. An fθ lens system having an entrance pupil at a remote position on the incident light side of the lens system and having negative distortion such that the image height H of a parallel light beam incident at an angle θ with respect to the optical axis with said entrance pupil as the center is $H = f\theta$, where f is the focal length of the entire system, said lens system including, in succession from the entrance pupil side:

a first group having at least one negative lens and having a composite negative refractive power;

a second and a third group each having a meniscus lens component having its concave surface facing said entrance pupil side; and a fourth group having at least one positive lens and having a composite positive refractive power;

and wherein the lens system satisfies the following conditions:

$$0.08f < R_{III} < 0.35f$$

$$|R_{III}| < |R_{II}|$$

$$f < f_{II}$$

$$f < f_{III}$$

$$0.8 < R_4/R_3 < 1.2$$

$$0.7 < R_6/R_5 < 1.5$$

where $R_3$ and $R_4$ represent the radii of curvature of the opposite lens surfaces of said second group from said entrance pupil side, $R_5$ and $R_6$ represent the radii of curvature of the opposite lens surfaces of said third group from said entrance pupil side, $R_{II}=(R_3+R_4)/2$, $R_{III}=(R_5+R_6)/2$, and $f_{II}$ and $f_{III}$ represent the focal lengths of said second group and said third group, respectively.

2. An $f\theta$ lens system according to claim 1, wherein the radii of curvature of the opposite lens surfaces of each meniscus lens of said second and third groups are substantially equal.

3. An $f\theta$ lens system according to claim 1, wherein said first group has, in succession from said entrance pupil side, a positive lens and a negative lens, and said fourth group has a single positive lens.

4. An $f\theta$ lens system according to claim 3, wherein numerical data are as follows:

$$f = 100 \text{ mm}, 2\omega = 45°$$

The entrance pupil lies 7.095 mm ahead of the first lens surface $\gamma_1$;

| | | | |
|---|---|---|---|
| $\gamma_1 = -152.993$ | $d_1 = 1.5$ | $n_1 = 1.51508$ | $\}\, G_1$ |
| $\gamma_2 = -13.156$ | $d_2 = 0.4$ | | |
| $\gamma_3 = -12.495$ | $d_3 = 2.4$ | $n_2 = 1.51508$ | $\}\, G_2$ |
| $\gamma_4 = 120.668$ | $d_4 = 2.4$ | | |
| $\gamma_5 = -33.261$ | $d_5 = 1.8$ | $n_3 = 1.51508$ | |
| $\gamma_6 = -33.113$ | $d_6 = 2.4$ | | |
| $\gamma_7 = -15.508$ | $d_7 = 5.5$ | $n_4 = 1.51508$ | $\}\, G_3$ |
| $\gamma_8 = -18.472$ | $d_8 = 2.0$ | | |
| $\gamma_9 = 238.413$ | $d_9 = 4.5$ | $n_5 = 1.51508$ | $\}\, G_4$ |
| $\gamma_{10} = -37.308$ | | | |
| $f_I = -109.8$ | $f_{II} = 2814$ | | |
| $f_{III} = -508.0$ | $f_{IV} = 64.0$ | | | where $\gamma_1, \gamma_2, \ldots, \gamma_{10}$ represent the radii of curvature of the successive lens surfaces from said entrance pupil side, $d_1, d_2, \ldots, d_9$ represent the center thicknesses and air spaces of the successive lenses, $n_1, n_2, \ldots, n_5$ represent the refractive indices of the successive lenses for light of wavelength 6328 Å, and $f_I, \ldots, f_{IV}$ represent the focal lengths of said groups.

* * * * *